United States Patent
Nowak et al.

(10) Patent No.: US 9,145,798 B2
(45) Date of Patent: Sep. 29, 2015

(54) MECHANICALLY CONTROLLABLE VALVE DRIVE ARRANGEMENT

(71) Applicant: KOLBENSCHMIDT PIERBURG INNOVATIONS GMBH, Neckarsulm (DE)

(72) Inventors: Martin Nowak, Leverkusen (DE); Karsten Grimm, Aachen (DE); Michael Breuer, Simmerath (DE); Heinrich Dismon, Gangelt (DE)

(73) Assignee: KOLBENSCHMIDT PIERBURG INNOVATIONS GMBH, Neckarsulm (DE)

( * ) Notice: Subject to any disclaimer, the term of this patent is extended or adjusted under 35 U.S.C. 154(b) by 0 days.

(21) Appl. No.: 14/372,218

(22) PCT Filed: Nov. 29, 2012

(86) PCT No.: PCT/EP2012/073923
§ 371 (c)(1),
(2) Date: Jul. 15, 2014

(87) PCT Pub. No.: WO2013/113425
PCT Pub. Date: Aug. 8, 2013

(65) Prior Publication Data
US 2015/0108383 A1    Apr. 23, 2015

(30) Foreign Application Priority Data
Jan. 30, 2012    (DE) .......................... 10 2012 001 633

(51) Int. Cl.
*F01L 1/34*    (2006.01)
*F01L 13/00*   (2006.01)
(Continued)

(52) U.S. Cl.
CPC . *F01L 1/34* (2013.01); *B62D 65/10* (2013.01); *F01L 1/18* (2013.01); *F01L 1/20* (2013.01);
(Continued)

(58) Field of Classification Search
CPC .............. F01L 1/08; F01L 1/18; F01L 1/185; F01L 1/34; F01L 1/44; F01L 1/46; F01L 1/2405; F01L 13/0026; F01L 13/0063; F01L 2013/0068; F01L 2103/01; F01L 2105/02; F16K 31/52408; F16K 31/524; F16K 1/54; F16K 1/00; F01M 1/18
USPC .............. 123/90.16, 90.2, 90.21, 90.39, 90.4, 123/90.44, 90.65
See application file for complete search history.

(56) References Cited

U.S. PATENT DOCUMENTS 7,387,096 B2 *  6/2008  Tashiro ...................... 123/90.16
7,404,385 B2 *  7/2008  Tashiro et al. ............. 123/90.16

(Continued)

FOREIGN PATENT DOCUMENTS

DE    1 908 833 A     1/1965
DE    28 19 356 A1    11/1979

(Continued)

*Primary Examiner* — Stephen K Cronin
*Assistant Examiner* — Grant Moubry
(74) *Attorney, Agent, or Firm* — Norman B. Thot

(57) ABSTRACT

An intermediate lever arrangement for a mechanically-controllable valve drive arrangement, includes a pivot lever arrangement. At least one intermediate lever(s) comprising a working cam is configured to be in an operative connection with the pivot lever arrangement. A bearing shaft is arranged on the at least one intermediate lever(s). An engagement element comprising a circumferential point is mounted in the at least one intermediate lever(s) arrangement so as to rotate about an axis of rotation. A fixing device is arranged on the bearing shaft. The fixing device is configured to fix the engagement element in a defined position. A device is configured so that the circumferential point of the engagement element, upon a rotation by an angle α, describes a curved shape which deviates from an arc of a circle.

8 Claims, 3 Drawing Sheets

(51) Int. Cl.
  B62D 65/10 (2006.01)
  F01L 1/20 (2006.01)
  F16K 31/524 (2006.01)
  *F01L 1/08* (2006.01)
  *F01L 1/18* (2006.01)
  *F01L 1/24* (2006.01)

(52) U.S. Cl.
  CPC ......... *F01L 13/0026* (2013.01); *F01L 13/0063* (2013.01); *F16K 31/52408* (2013.01); *F01L 1/08* (2013.01); *F01L 1/185* (2013.01); *F01L 1/2405* (2013.01); *F01L 2013/0068* (2013.01); *F01L 2103/01* (2013.01); *F01L 2105/02* (2013.01); *Y10T 29/49231* (2015.01); *Y10T 29/49247* (2015.01)

(56) References Cited

U.S. PATENT DOCUMENTS

| | | | |
|---|---|---|---|
| 7,418,935 B2 * | 9/2008 | Flierl et al. | 123/90.39 |
| 7,895,981 B2 * | 3/2011 | Bosl-Flierl et al. | 123/90.39 |
| 8,079,337 B2 * | 12/2011 | Kim et al. | 123/90.39 |
| 8,118,003 B2 * | 2/2012 | Nishida et al. | 123/90.16 |
| 2003/0029404 A1 | 2/2003 | Kampichler | |
| 2006/0201459 A1 | 9/2006 | Flierl et al. | |
| 2007/0266971 A1 | 11/2007 | Bosl-Flierl et al. | |
| 2008/0087242 A1 * | 4/2008 | Nakamura | 123/90.17 |

FOREIGN PATENT DOCUMENTS

| | | |
|---|---|---|
| DE | 101 05 807 C1 | 5/2002 |
| DE | 101 40 635 A1 | 4/2003 |
| DE | 102 37 560 A1 | 3/2004 |
| DE | 103 23 665 A1 | 12/2004 |
| DE | 10 2006 033 559 A1 | 1/2008 |
| DE | 10 2007 022 266 A1 | 11/2008 |
| DE | 10 2008 047 480 A1 | 4/2010 |
| EP | 1 760 278 A2 | 3/2007 |
| EP | 1 618 293 B1 | 9/2008 |
| GB | 113428 A | 5/1918 |
| GB | 2 020 389 A | 11/1979 |
| GB | 2 428 451 A | 1/2007 |
| JP | 63-230916 A | 9/1988 |
| JP | 2005-530092 A | 10/2005 |
| JP | 2006-161602 A | 6/2006 |
| JP | 2006-521495 A | 9/2006 |

\* cited by examiner

MECHANICALLY CONTROLLABLE VALVE DRIVE ARRANGEMENT

CROSS REFERENCE TO PRIOR APPLICATIONS

This application is a U.S. National Phase application under 35 U.S.C. §371 of International Application No. PCT/EP2012/073923, filed on Nov. 29, 2012 and which claims benefit to German Patent Application No. 10 2012 001 633.6, filed on Jan. 30, 2012. The International Application was published in German on Aug. 8, 2013 as WO 2013/113425 A1 under PCT Article 21(2).

FIELD

The present invention relates to an intermediate lever arrangement for a mechanically-controllable valve drive arrangement comprising at least one intermediate lever having a working cam for operative connection to a pivot lever arrangement, wherein an engagement element mounted rotatably about an axis of rotation by means of a bearing shaft is provided. The present invention further relates to a transmission arrangement comprising such an intermediate lever arrangement, and to a mechanically-controllable valve drive arrangement.

BACKGROUND

Such arrangements have previously been described in the field of internal combustion engines. DE 10 2006 033 559 A1 and DE 10 2007 022 266 A1, for example, describe valve drive arrangements wherein a respective gas exchange valve is adjustable in its lifting height. For this purpose, both of the valve drive arrangements are provided with an intermediate lever arrangement which is connected to a cam shaft for periodically moving the gas exchange valve and comprises a working element by which the maximally and respectively minimally attainable lifting height is adjustable. Due to manufacturing tolerances, however, all of these valve drive arrangements have the disadvantage that they will not have the exactly-desired valve stroke after manufacture and subsequent assembly. In view of the requirement of an identical valve stroke for all valves and cylinders, this disadvantage may lead to an unsatisfactory operating performance of the engine, particularly for small valve strokes.

SUMMARY

An aspect of the present invention was to provide an intermediate lever arrangement for a mechanically-controllable valve drive arrangement which avoids the above-described disadvantages.

In an embodiment, the present invention provides an intermediate lever arrangement for a mechanically-controllable valve drive arrangement which includes a pivot lever arrangement. At least one intermediate lever(s) comprising a working cam is configured to be in an operative connection with the pivot lever arrangement. A bearing shaft is arranged on the at least one intermediate lever(s). An engagement element comprising a circumferential point is mounted in the at least one intermediate lever(s) arrangement so as to rotate about an axis of rotation. A fixing device is arranged on the bearing shaft. The fixing device is configured to fix the engagement element in a defined position. A device is configured so that the circumferential point of the engagement element, upon a rotation by an angle α, describes a curved shape which deviates from an arc of a circle.

BRIEF DESCRIPTION OF THE DRAWINGS

The present invention is described in greater detail below on the basis of embodiments and of the drawings in which.

DETAILED DESCRIPTION

In an embodiment, the present invention provides that a circumferential point of at least one engagement element, upon rotation by an angle α, will describe a curved shape deviating from an arc of a circle, wherein fixing means are provided for fixing the engagement element in a defined position. The design of such an intermediate lever arrangement makes it possible to adjust the lifting height of the valve drive arrangement in a simple manner both in the pre-assembled state and when being mounted in a motor vehicle. Manufacturing tolerances or faults and even wear phenomena can thereby be compensated with respect to the desired lifting height.

The means can be designed so that the engagement element comprises a cam. In an embodiment, the means are designed so that an eccentric bearing support of the engagement element is provided, wherein the engagement element has a circular shape. The engagement elements of this embodiment can, for example, be mass produced.

The fixing means can, for example, consist of a spring element corresponding with a first end of the bearing shaft, the spring element being adapted to fix the bearing shaft in a specific rotational position. For a stepped, precise adjustment, the bearing shaft at a second end can, for example, comprise a first toothing which corresponds with a second toothing in the bearing region of the bearing shaft.

In an embodiment, the present invention provides an intermediate lever arrangement where the intermediate levers are connected to each other at the end opposite to the working cam with the aid of a connection shaft, wherein first rolls are provided for a force transmission from a cam shaft to the intermediate levers, and where a second roll is provided between the intermediate levers for guidance in a sliding block.

In an embodiment, the present invention provides a transmission arrangement comprising such an intermediate lever arrangement, wherein a pivot lever arrangement is provided which is in operative connection with the intermediate lever arrangement, each intermediate lever corresponding with a pivot lever.

In an embodiment, the present invention provides a mechanically-controllable valve drive arrangement comprising a plurality of serially-arranged gas exchange valves which each have respective cylinders assigned thereto, wherein two gas exchange valves have a transmission arrangement assigned thereto, wherein each transmission arrangement is mounted in the cylinder head so as to be movable via bearing means, wherein each transmission arrangement is in operative connection with a respective valve stroke adjustment device and a cam shaft, wherein each valve stroke adjustment device comprises a rotatable adjustment element provided with an eccentric element acting on the engagement element of the transmission arrangement against the biasing force of a spring element.

The present invention will hereinafter be explained in greater detail with reference to the drawings.

Figure 1:
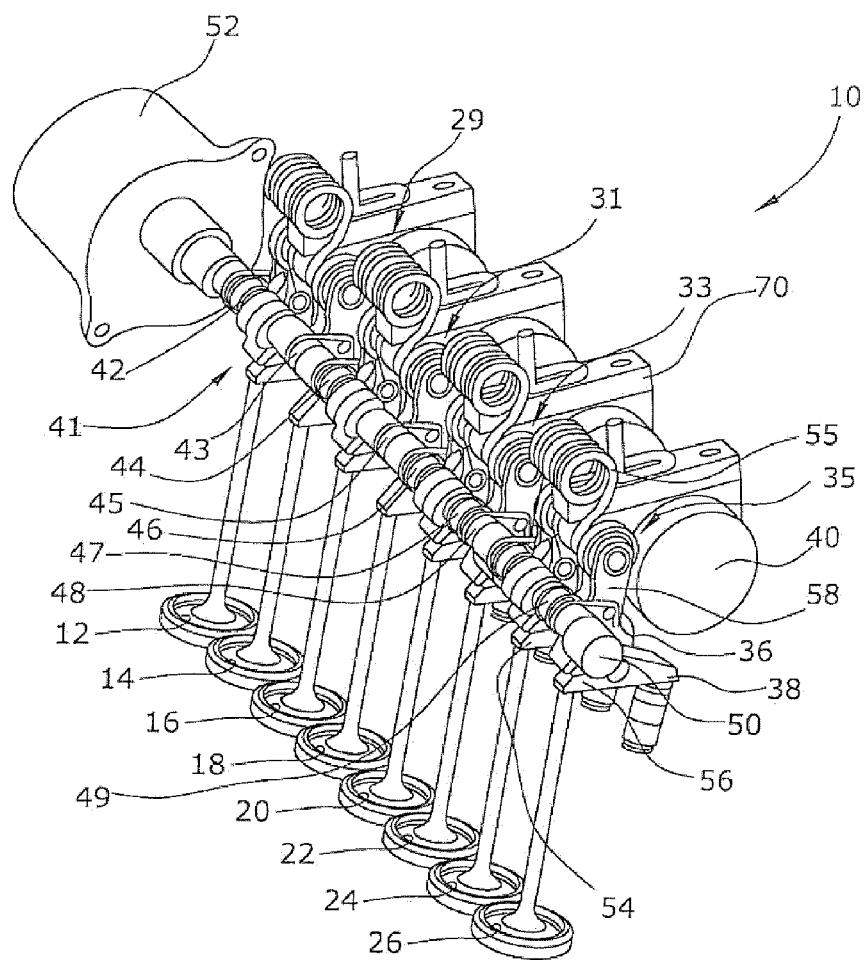
FIG. 1 is a perspective view of a valve drive arrangement according to the present invention.

FIG. 1 shows an embodiment of a valve drive arrangement 10 according to the present invention comprising a plurality of serially-arranged gas exchange valves 12, 14, 16, 18, 20, 22, 24 and 26. In the present case, two respective inlet gas exchange valves are assigned to a cylinder of the internal combustion engine. The mechanically-controllable valve drive arrangement 10 comprises, in the present case, four transmission arrangements 29, 31, 33 and 35 having assigned to them two respective gas exchange valves 12, 14; 16, 18; 20, 22; 24, 26. The transmission arrangements 29, 31, 33 and 35 are herein supported in the cylinder head in a known manner with the aid of bearing means. In FIG. 1, the bearing means 36, 38 are illustrated merely by way of example for the bearing support of a pivot lever 56 of the transmission arrangement 35. The transmission arrangements 29, 31, 33 and 35 are further in operative connection with a cam shaft 40 in a known manner. Apart therefrom, each transmission arrangement 29, 31, 33 and 35 is controllable by adjustment elements 42, 43; 44, 45; 46, 47 and 48, 49 of a valve stroke adjustment device 41 in a manner so that a smaller or larger valve stroke of the inlet valves 12, 14; 16, 18; 20, 22; 24, 26 can be set in the present exemplary embodiment, the adjustment elements 42, 43, 44, 45, 46, 47 and 48, 49 are respectively assigned to the inlet valves 12, 14; 16, 18; 20, 22; 24, 26 and are designed as eccentric elements provided on an eccentric shaft 50 and acting on engagement elements 75. In the present exemplary embodiment, the eccentric shaft 50 can be driven by a drive element 52 in a known manner. It can also be provided that each individual gas exchange valve has a transmission arrangement assigned to it. As a drive element 52, use can be made both of a forward-running and a rearward-running rotary drive. The eccentric shaft 50 can thus be driven in a manner that, depending on the present position, the valve stroke corresponding to the next operational state can be selected quickly and precisely by use of the corresponding eccentric elements. Rotary angles of >360° can thus also be realized.

In the present embodiment, a transmission arrangement 35 is provided for the gas exchange valves 24 and 26. The transmission arrangement 35 herein consists of an intermediate lever arrangement 58 and two pivot lever arrangements 54 and 56, wherein the intermediate lever arrangement 58 is in operative connection with the pivot lever arrangements 54 and 56 via working cams and wherein the pivot lever arrangement 56 by an end face thereof engages the gas exchange valve 26, and the pivot lever arrangement 58 is in operative connection with the valve stroke adjustment device 41 and the cam shaft 40. In this configuration, the adjustment element 49 of valve stroke adjustment device 41 engages, against a biasing force of a spring 55, an engagement element (for example, a roll, see FIG. 2), not illustrated in further detail, of intermediate lever arrangement 58. The intermediate lever arrangement 58 engages the pivot lever arrangement 54, 56 by means of working cams 60, 61 not illustrated in further detail in FIG. 1.

Figure 2:
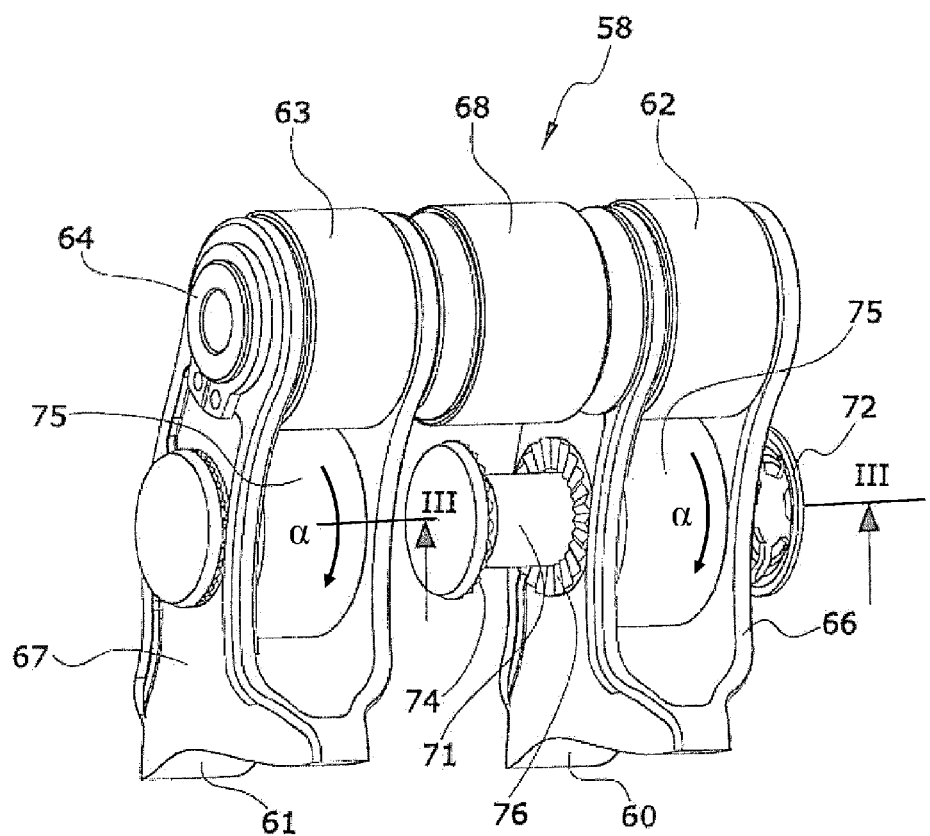
FIG. 2 is a perspective view of an embodiment of an intermediate lever arrangement according to the present invention.

An intermediate lever arrangement 58 according to the present invention is illustrated in greater detail in FIG. 2. On the sides opposite to the working cams 60, 61, there are arranged first rolls 62, 63 by means of which the intermediate lever arrangement 58 is in operative connection with cam shaft 40 in a known manner. These first rolls 62, 63 are in turn arranged on a connection shaft 64 connecting two adjacent intermediate levers 66, 67 with each other, wherein, between said first rolls 62, 63, also a second roll 68 is arranged on shaft 64, serving as a guide roll and being supported in a sliding block 70 (see FIG. 1). As to the function and operation of such a transmission arrangement, explicit reference is made to DE 10 140 635 A1. It should be noted that an intermediate lever arrangement 58 can also comprise merely one intermediate lever wherein, in this case, a roll arranged opposite to the working cam will be in operative connection with cam shaft 40 and will also provide the guidance in said sliding block 70.

In the present embodiment, the intermediate lever arrangement 58 comprises two intermediate levers 66, 67 and is correspondingly in operative connection with two pivot levers, not shown in greater detail, via two working cams 60, 61. Particularly in case of small valve strokes, it should be safeguarded that the valve strokes of the individual gas exchange valves coincide with each other. In this regard, the present exemplary embodiment now provides that the engagement elements, while designed as rollers 75, are arranged eccentrically by means of a bearing shaft 71 so that, upon rotation by an angle α, a circumferential point of the rollers 75 will describe a curved shape deviating from an arc of a the present exemplary embodiment, the fixing means consist of a spring element 72 corresponding to a first end of the bearing shaft 71, by which the bearing shaft 71 can be fixed in a specific rotary position. The bearing shaft 71 further comprises, at a second end thereof, a first toothing 74 corresponding to a second toothing 76 in the bearing area of the bearing shaft. Now, by rotation of the bearing shaft in the operational state or also during a pre-assembly process, the valve stroke of the associated gas exchange valve can be adjusted, and in this manner, manufacturing tolerances or also wear phenomena can be eliminated.

Figure 3:
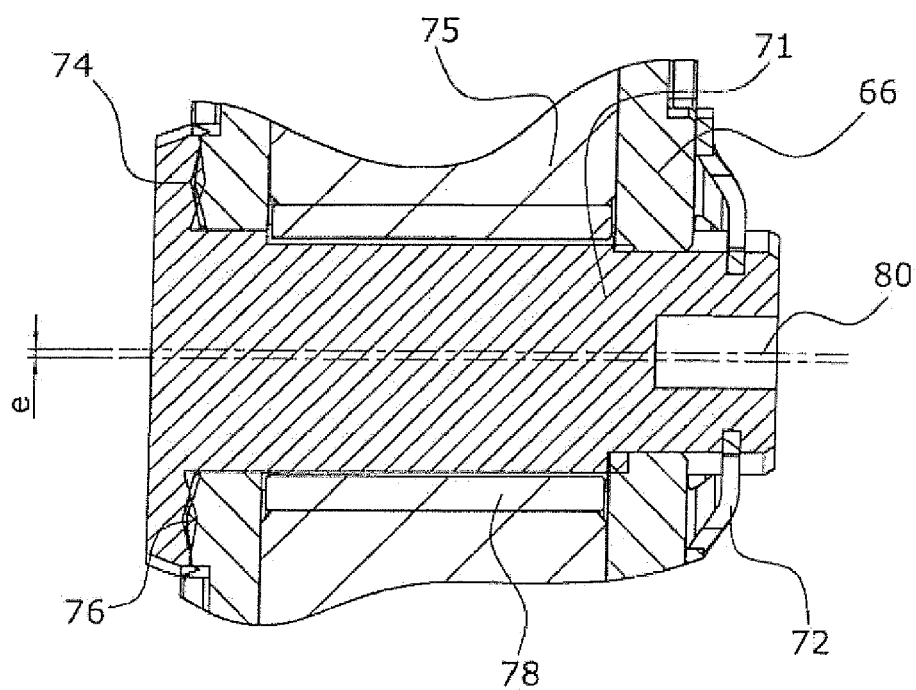
FIG. 3 is a sectional view of the intermediate lever shown in FIG. 2.

FIG. 3 shows a sectional view of intermediate lever 66 of FIG. 2. The engagement element 75 is here designed as a roller and is supported for rotation on a bearing shaft 71 by means of a needle bearing 78. Relative to a rotational axis of intermediate lever 66, the bearing shaft 71 has an eccentricity e, whereby a rotation by an angle α will result in a curved shape deviating from an arc of a circle. Herein, for rotation in the assembled state, the bearing shaft 71 is provided with a slot 80 to be engaged by a tool so that, against the spring force of spring 72, the form-locking connection of the first toothing 74 and the second toothing 76 can be released and the bearing shaft 71 will thus be allowed to be rotated.

The described embodiment allows for a maximum of flexibility when adjusting the height of the valve stroke. It should, however, be evident that in such an embodiment of an intermediate lever arrangement, it is also possible to realize only one intermediate lever while providing means to the effect that a circumferential point of the engagement element upon rotation by an angle α will describe a curved shape deviating from an arc of a circle. It can also be contemplated to support the engagement element centrically, wherein the engagement element itself will not have the shape of a circular ring but will, for example, comprise one or a plurality of cams.

The present invention is not limited to embodiments described herein; reference should be had to the appended claims.

What is claimed is:

1. An intermediate lever arrangement for a mechanically-controllable valve drive arrangement, the intermediate lever arrangement comprising:
   a pivot lever arrangement;
   at least one intermediate lever(s) comprising a working cam configured to be in an operative connection with the pivot lever arrangement;
   a bearing shaft arranged on the at least one intermediate lever(s);

an engagement element comprising a circumferential point, the engagement element being mounted in the at least one intermediate lever(s) arrangement so as to rotate about an axis of rotation;

a fixing device arranged on the bearing shaft, the fixing device being configured to fix the engagement element in a defined position; and a device configured so that the circumferential point of the engagement element, upon a rotation by an angle α, describes a curved shape which deviates from an arc of a circle.

2. The intermediate lever arrangement as recited in claim 1, wherein the device is provided so that the engagement element comprises a cam.

3. The intermediate lever arrangement as recited in claim 1, wherein the device is provided so that the engagement element comprises an eccentric bearing support and a circular shape.

4. The intermediate lever arrangement as recited in claim 1, wherein the bearing shaft (71) comprises a first end, the fixing device consists of a spring element arranged on the first end of the bearing shaft, and the spring element is configured to fix the bearing shaft in a specific rotational position.

5. The intermediate lever arrangement as recited in claim 4, wherein the bearing shaft further comprises a second end comprising a first toothing and a bearing region comprising a second toothing, and the second toothing is configured to correspond with the first toothing.

6. The intermediate lever arrangement as recited in claim 1, further comprising:
   a cam shaft;
   a first roll configured to transmit a force from the cam shaft to each of the at least one intermediate lever(s);
   a connection shaft; and
   a second roll arranged between two of the at least one intermediate lever(s), the second roll being configured to be guided in a sliding block,
   wherein, two of the at least one intermediate lever(s) are connected to each other at an end opposite to the working cam via the connection shaft.

7. A transmission arrangement comprising: an intermediate lever arrangement comprising: at least one intermediate lever(s) comprising a working cam; a bearing shaft arranged on the at least one intermediate lever(s); an engagement element comprising a circumferential point, the engagement element being mounted in the at least one intermediate lever(s) arrangement so as to rotate about an axis of rotation; a fixing device arranged on the bearing shaft, the fixing device being configured to fix the engagement element in a defined position; and a device configured so that the circumferential point of the engagement element, upon a rotation by an angle .alpha., describes a curved shape which deviates from an arc of a circle; and a pivot lever arrangement comprising a pivot lever, the pivot lever arrangement being configured to be in an operative connection with the intermediate lever arrangement, wherein each of the at least one intermediate lever(s) corresponds with the pivot lever.

8. A mechanically-controllable valve drive arrangement comprising:
   a plurality of serially-arranged gas exchange valves;
   cylinders assigned to each of the plurality of serially-arranged gas exchange valves;
   a spring element comprising a biasing force;
   a cam shaft;
   a transmission arrangement as recited in claim 7, the transmission arrangement further comprising an engagement element;
   a valve stroke adjustment device comprising a rotatable adjustment element which comprises an eccentric element, the eccentric element being configured to act on the engagement element of the transmission arrangement against the biasing force of the spring element,
   wherein,
   the transmission arrangement is assigned to two of the serially-arranged gas exchange valves,
   each transmission arrangement is configured so as to be movably supported in a cylinder head via a bearing, and
   each transmission arrangement is configured to be in an operative connection with the valve stroke adjustment device and the cam shaft.

* * * * *